Figure 1:
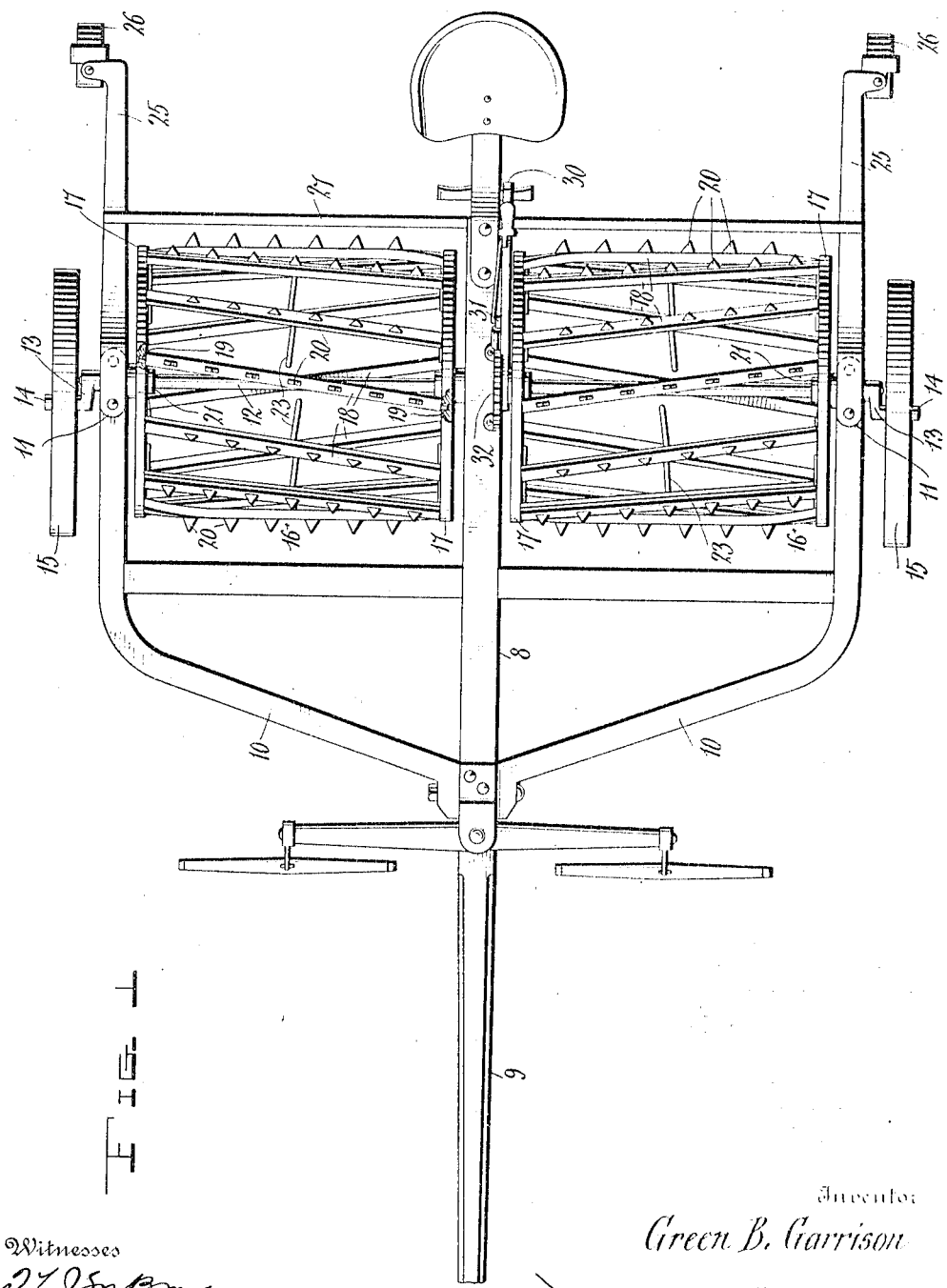

G. B. GARRISON.
AGRICULTURAL IMPLEMENT.
APPLICATION FILED JULY 7, 1910.

1,039,269.

Patented Sept. 24, 1912.

3 SHEETS—SHEET 1.

Witnesses

Inventor
Green B. Garrison

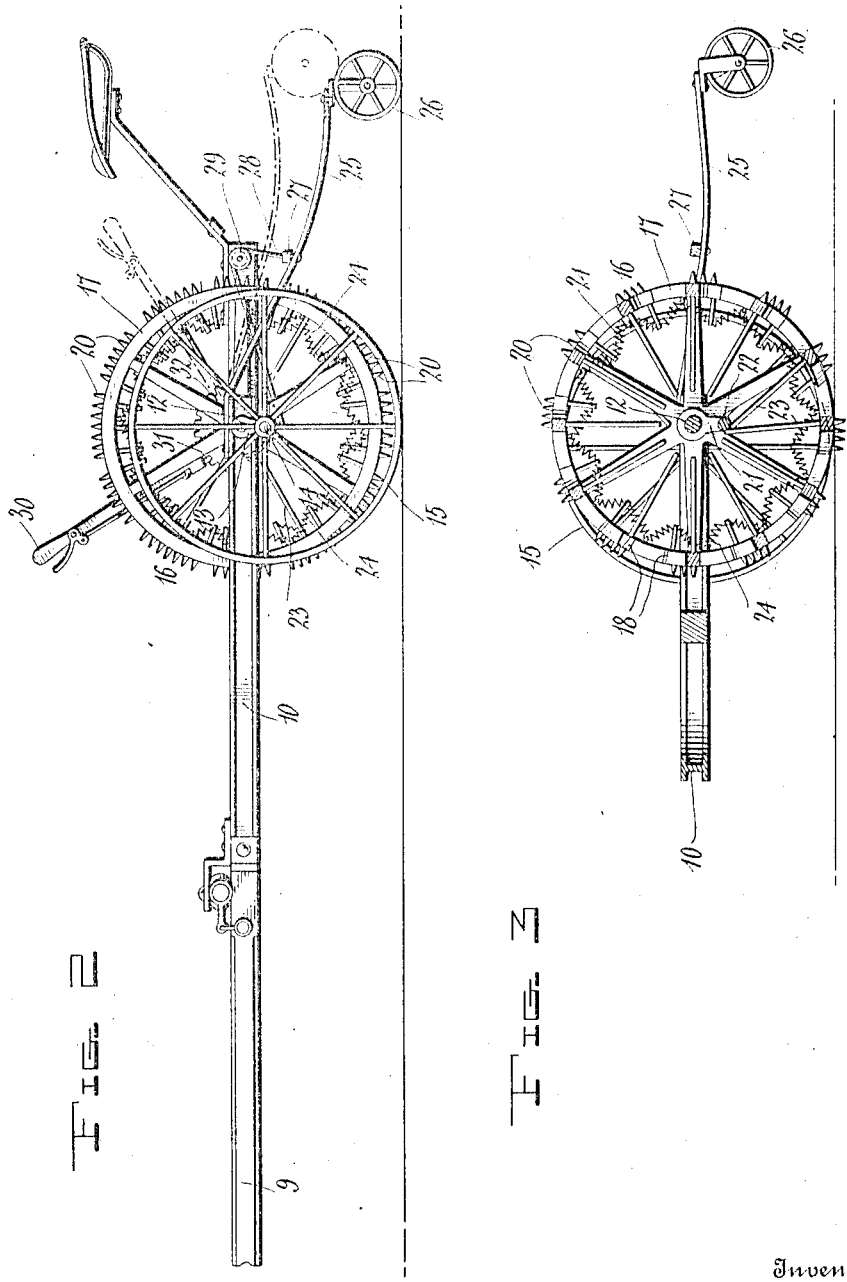

G. B. GARRISON.
AGRICULTURAL IMPLEMENT.
APPLICATION FILED JULY 7, 1910.
1,039,269.
Patented Sept. 24, 1912.
3 SHEETS—SHEET 3.
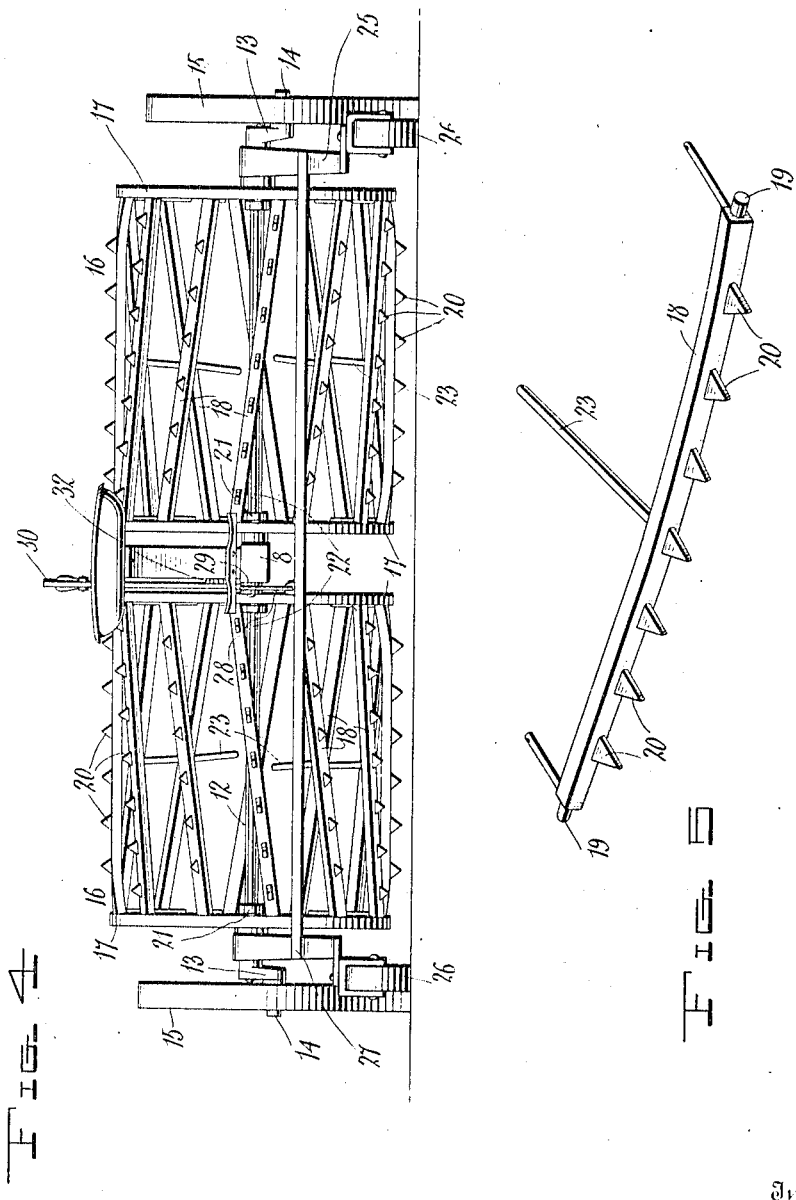
Witnesses
Inventor
Green B. Garrison
By 
Attorneys

UNITED STATES PATENT OFFICE.

GREEN B. GARRISON, OF MYRTLE, MISSOURI.

AGRICULTURAL IMPLEMENT.

1,039,269.    Specification of Letters Patent.    Patented Sept. 24, 1912.

Application filed July 7, 1910. Serial No. 570,815.

*To all whom it may concern:*

Be it known that I, GREEN B. GARRISON, a citizen of the United States, residing at Myrtle, in the county of Oregon, State of Missouri, have invented certain new and useful Improvements in Agricultural Implements; and I do hereby declare the following to be a full, clear, and exact description of the invention, such as will enable others skilled in the art to which it appertains to make and use the same.

The invention relates to an agricultural implement and more particularly to the class of crushing and pulverizing machines.

The primary object of the invention is the provision of a machine or implement of this character by which the ground is prepared for the reception of seed by crushing and pulverizing clods and lumps of dirt and also by leveling the earth when crushed or pulverized.

Another object of the invention is the provision of a machine of this character wherein the construction is generally improved and is light and compact, consistent with strength and durability, and also one that may be manufactured at a minimum cost.

A still further object of the invention is the provision of a machine of this character wherein the crushing and pulverizing rollers may be moved into and out of position for operation at the will of an operator or driver of the machine.

With these and other objects in view the invention consists in the construction, combination and arrangement of parts as will be hereinafter more fully described, illustrated in the accompanying drawings which disclose the preferred form or embodiment of the invention, to enable those skilled in the art to carry the invention into practice and as pointed out in the claim hereunto appended.

In the drawings:—Figure 1 is a top plan view of an implement constructed in accordance with the invention. Fig. 2 is a side elevation thereof with its crushing and pulverizing rollers in inoperative position. Fig. 3 is a longitudinal sectional view with one of the crushing and pulverizing rollers shown in operative position. Fig. 4 is a rear elevation of the machine. Fig. 5 is a detail perspective view of one of the movable tooth supporting bars removed from the roller.

Similar reference characters indicate corresponding parts throughout the several views in the drawings.

In the drawings there is shown a crushing and pulverizing machine comprising a center beam 8, terminating at its forward end in a draft pole 9, and secured to this beam 8, at opposite sides thereof are the inwardly converging forward extremities of side beams or bars 10, which latter are suitably braced and held in horizontal alinement with the said center beam. Fixed to the center beam 8, and to the side beams 10 are alining bearings 11, in which is mounted a main axle 12, the latter formed with crank extremities 13, having stud journals 14 to which are loosely connected the usual ground wheels 15, to permit the travel of the machine through a field.

At opposite sides of the center beam 8, and between it and the side bars 10, are disposed crushing and pulverizing rollers 16, which latter are loosely journaled upon the axle 12, each roller being of skeleton form and composed of spider heads 17, connected by a plurality of bars 18, the same being angularly disposed with respect to the center draft of the machine and formed with trunnion ends 19, engaging in the annular rims of the said heads whereby the said bars 18 are capable of slight rotation for the purpose that will be hereinafter described.

Fixed to each bar 18, are a plurality of teeth 20, which are arranged in spaced relation to each other and it is to be understood that the number of teeth may be increased or decreased depending upon the size and capacity of the implement and the character of land upon which it is to be used. The teeth are wedge-shaped and have their penetrating ends made rounding so as to provide approximately spade-shaped edges to the teeth.

Integral with the axle 12, within the rollers 16, are spaced extensions 21, the latter supporting a roller 22, which extends throughout a greater portion of the length of each roller 16, and projecting into the path of this roller 22, are arms 23, integral with the bars 18, centrally thereof so that upon rotation of the rollers 16 the arms 23, will frictionally engage the roller 22, so that the said arms will effect a change in the direction of the teeth 20, when leaving the earth to lift the soil during the advancement of the machine. Connected to opposite sides of the arms 23, are springs 24, which latter are also connected to the annular rims of the heads 17, of the rollers to normally hold the teeth 20, projected radially of the rollers 14, prior to the penetration of the teeth in the soil.

Connected to the rear extremities of the side bars 10, are the inner ends of downwardly curved resilient bracket arms 25, on which are swiveled suitable brackets in which are journaled gage wheels 26, and these arms 25, are connected by a tie rod 27, having centrally connected thereto one end of a cable 28, the same being trained over a pulley 29, suitably journaled at the rear end of the center beam 8, and this cable 28, has its opposite end connected to a throw lever 30, rigidly fixed to the axle 12, adjacent the center beam 8, the said throw lever 30, carrying a locking pawl 31, engaging a tooth segment 32, fixed vertically upon the center beam 8, of the machine. The said throw lever is adapted to turn the axle 12, to either raise or lower the ground wheels 15, or the crushing and pulverizing rollers 14, toward or away from the ground. Also this throw lever is adapted to regulate the gage wheels when effecting the raising and lowering of the ground wheels and crushing and pulverizing rollers of the machine.

In operation, presuming that the ground wheels have been raised, in the manner as heretofore stated and, that the crushing and pulverizing rollers have been brought into contact with the ground, the machine is advanced upon the ground which will cause the teeth to penetrate into the soil and during the advancement of the machine these teeth will lift the soil and at the same time break and crush the clods and lumps thereof. As the spider heads 17 are rotated the bars 18 will be rocked by engagement of the rods 23 with the roller 22 so that the teeth 20 of said bars 18 will break up the soil lumps or clods.

From the foregoing, the construction and operation of the invention will be clear without the requirement of a more extended explanation, and therefore the same has been omitted.

What is claimed is:—

The combination with an axle having crank arms formed thereon, supporting means carried by the crank arms, spiders mounted upon the axle and arranged in spaced relation to each other, rocking bars pivotally mounted on the spiders, said rocking bars being provided with pulverizing teeth, rods secured to the rocking bars and projecting inwardly therefrom, a roller mounted upon said axle for actuating the rods and rocking the bars, and means for rocking the axle whereby the rocking bars are brought into and out of engagement with the earth substantially as and for the purposes set forth.

In testimony whereof, I affix my signature, in presence of two witnesses.

GREEN B. GARRISON.

Witnesses:
 IDA C. WHITEHEAD,
 GEORGE T. WHITEHEAD.